United States Patent [19]
Ellis

[11] Patent Number: 5,511,928
[45] Date of Patent: Apr. 30, 1996

[54] BOAT LOADING DEVICE

[76] Inventor: Robert S. Ellis, 609 E. Kelly Rd., Bellingham, Wash. 98226

[21] Appl. No.: 334,861

[22] Filed: Nov. 4, 1994

[51] Int. Cl.⁶ ...................................................... B60R 9/00
[52] U.S. Cl. ........................ 414/462; 224/310; 114/344; 280/414.1; 414/477
[58] Field of Search ................... 405/1, 2; 414/462, 414/477, 478, 480, 500, 522; 298/12, 14; 224/310; 280/414.1; 114/344

[56] References Cited

U.S. PATENT DOCUMENTS

| | | | |
|---|---|---|---|
| 3,282,455 | 11/1966 | Demarais | 414/462 |
| 3,460,693 | 8/1969 | Oldham | 414/462 |
| 3,550,800 | 12/1970 | Robinson | 414/462 |
| 3,927,779 | 12/1975 | Johnson | 414/462 |
| 4,234,285 | 11/1980 | Martinez | 414/462 |
| 4,565,482 | 1/1986 | Baker | 414/462 |
| 5,069,595 | 12/1991 | Smith et al. | 414/462 |
| 5,071,308 | 12/1991 | Tibbet | 414/462 |

FOREIGN PATENT DOCUMENTS 128821  5/1991  Japan ...................... 414/462

*Primary Examiner*—Frank E. Werner
*Attorney, Agent, or Firm*—Jensen & Puntigam

[57] ABSTRACT

A boat loading device including a first frame secured to a vehicle supporting a second frame selectively extendable to a launch/retrieve position and retractable to a carry position. The device is usable upon a truck or trailer and can be used to carry objects other than boats. The device is easily removed from the vehicle and includes safety devices preventing accidental launch.

2 Claims, 5 Drawing Sheets

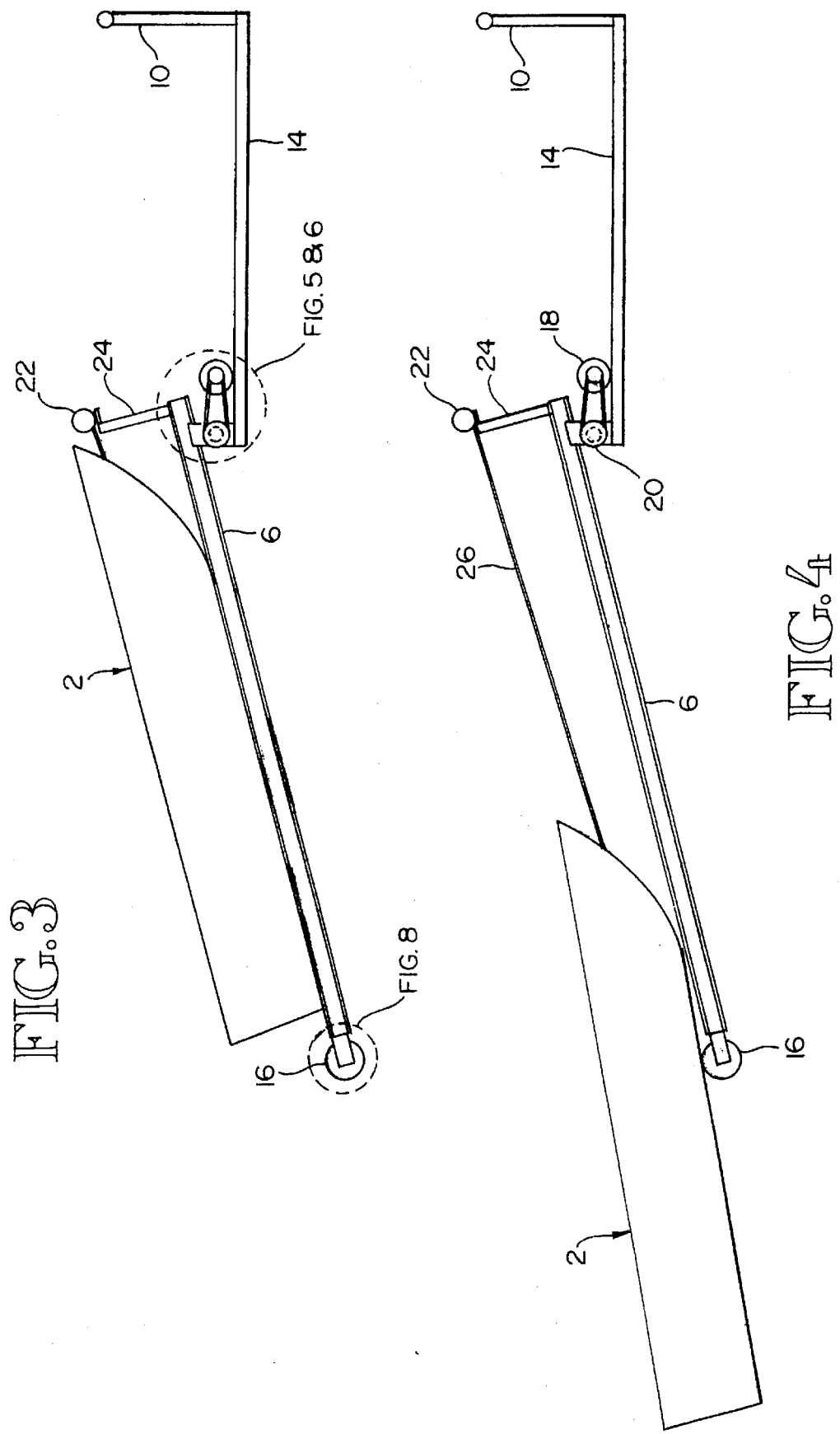

BOAT LOADING DEVICE

TECHNICAL FIELD

This invention lies in the field of loading and hauling apparatus and more particularly to an apparatus which is capable of moving a boat or other heavy object from a position on the ground or in the water at a point distal from the carrying vehicle, such that the carrying vehicle need not have its wheels immersed during launching or recovering of a boat to a position on top of the vehicle, be the vehicle a trailer or a pick-up truck, while retaining the ability to free the vehicle from its loading apparatus, including the load, for other diverse uses.

BACKGROUND ART

It is well known to use a trailer in conjunction with a motorized vehicle or a motorized vehicle by itself to transport a boat to a distant place for launching and recovery. Traditionally, the launching or recovery of a boat from or onto a trailer has involved backing the trailer into the water to the point where the boat would float free of the trailer. Normally, this would require that the wheels and the bearings of the trailer be exposed to the lubricant-diluting and often corrosive action of the water.

With respect to a device used to allow a boat to be transported in the bed of or on top of a vehicle, such as a pick-up truck, this normally involved complicated and potentially hull-damaging mechanisms and/or guides to assist in the placement or removal of the boat.

Examples of the prior art known to the present inventor include:

U.S. Pat. No. 2,586,485 granted to Schroeder, Feb. 19, 1952, which discloses rollers for loading and unloading the boat, which rollers may be retracted such that the boat rests upon a bunk during travel.

U.S. Pat. No. 2,809,496 granted to Geil, Oct. 15, 1957, discloses a boat trailer wherein the boat is actually mounted upon a second trolley unit which rolls outwardly relative to the trailer frame until the trolley and supported boat are in the water for launching or, in the alternative, in the water for recovery.

U.S. Pat. No. 3,058,352 granted to McDowell, Oct. 16, 1962, discloses a marine railway wherein a semi-permanent railway track is laid from dry ground to a position beneath the water and a boat is carried upon a dolly to and from the water.

U.S. Pat. No. 3,170,583 granted to Meyer, Feb. 23, 1965, discloses a car-top boat loader and carrier wherein a rack is pivotally mounted to the bumper of the car, and through the use of a telescopic extension and rollers, is moved to a position in contact with the ground such that the boat may be launched or recovered.

U.S. Pat. No. 3,221,899 granted to Gronlund, Dec. 7, 1965, discloses a boat support disposed adjacent the water's edge. The support is constructed so that it may be tilted to launch the boat located thereupon.

U.S. Pat. No. 3,227,292 granted to Jacobs, Jan. 4, 1966, discloses a boat ramp disposed adjacent a body of water wherein the boat is pulled onto the structure supported by keel contacting rollers and then the ramp is pivoted about a point approximate the center such that the boat is lifted out of the water.

U.S. Pat. No. 3,343,696 granted to Morrison, Sep. 26, 1967, discloses a self-loading boat carrier wherein the boat is pulled onto a device pivotably mounted to the top of a vehicle wherein the boat is supported by keel rollers and a pair of short bunks and the device is pivoted upwardly to place the boat on top of the vehicle.

U.S. Pat. No. 3,411,644 granted to Cook, Nov. 19, 1968, discloses an apparatus to be mounted on the top of a vehicle such as a pick-up truck including a ramp-mounted carrier to which the boat is secured and then drawn up onto the truck-mounted ramp.

U.S. Pat. No. 3,550,800 granted to Robinson, Dec. 29, 1970, discloses a boat carrier and launcher for a pick-up truck wherein the device is mounted in the bed of a pick-up truck and includes a secondary frame movable with respect to the main frame, allowing the device to extend outwardly permitting the launch or recovery of a boat and the placement upon the pick-up truck, extending over the cab thereof, for transportation.

U.S. Pat. No. 3,587,874 granted to Graf, Jun. 28, 1981, discloses a boat support and launching device which comprises a ramp positioned on shore with one end in the water and a boat is supported at its keel by a series of rollers and includes spaced outboard rollers to maintain balance.

U.S. Pat. No. 3,648,866 granted to Slown, Mar. 14, 1972, discloses a series of ramps enabling a trailer-mounted boat to be pulled up onto the back of a pick-up truck.

U.S. Pat. No. 3,708,081 granted to Schladenhauffen, Jan. 2, 1973, discloses an apparatus for loading a boat onto the top of a pick-up truck or the like which includes a pair of removable ramps upon which the boat is slid to its resting position.

U.S. Pat. No. 3,843,002 granted to Pihlgren, Oct. 22, 1974, discloses a pair of ramps and a winch-type structure allowing an owner to bring a trailer-mounted boat into the bed of a pick-up vehicle.

U.S. Pat. No. 4,212,580 granted to Fluck, Jul. 15, 1980, discloses a loading and support rack for carrying and launching a boat from a pick-up truck.

U.S. Pat. No. 4,274,788 granted to Sutton, Jan. 23, 1981, discloses a pick-up mounted device wherein the boat is supported upon bunks or bolsters and is then pulled to a position overlying the bed of the truck. A pivotable support member is pivoted upwardly and forwardly, moving the boat to the position overlying the cab of the vehicle.

U.S. Pat. No. 4,560,316 granted to Daniels, Dec. 24, 1985, discloses a unique trailer frame which is slidably adjustable upon the wheel carriage to adjust for load conditions and further discloses a roller-supported device permitting the carriage of a boat or the like.

BEST MODE FOR CARRYING OUT THE INVENTION

With the above-noted prior art in mind, it; is an object of the present invention to provide a device for carrying a boat or other object upon a wheeled vehicle wherein the device selectively extends outwardly of the vehicle sufficiently to permit the launch or recovery of a boat without the vehicle having to be placed into the water.

It is another object of the present invention to provide a structure for carrying a boat upon a wheeled vehicle wherein the structure may be quickly and easily removed from the vehicle, permitting alternate use of the vehicle.

Still another object of the present invention is to provide a device permitting the carriage of a boat upon a wheeled vehicle wherein said device is simple of structure, easy to maintain and easy to use.

Yet another object of the present invention is to provide a device enabling the carriage of a boat upon a wheeled vehicle wherein the boat is supported along the length of its hull, preventing damage thereto during transport.

Still a further object of the present invention is to provide a truck mounted boat transport device wherein the boat carrying framework may selectively be extended and retracted, the device including more than one safety device preventing accidental or inadvertent extension and including apparatus allowing quick and easy removal of the framework.

BRIEF DESCRIPTION OF THE DRAWINGS

FIG. 3 is a schematic side elevation view of the present invention showing the configuration with a boat about to be launched.

FIG. 4 is a side elevation view of the present invention with the boat in the launch or recovery position.

FIG. is a detailed view of the mechanism for transporting the boat to its position upon the vehicle.

Figure 5:
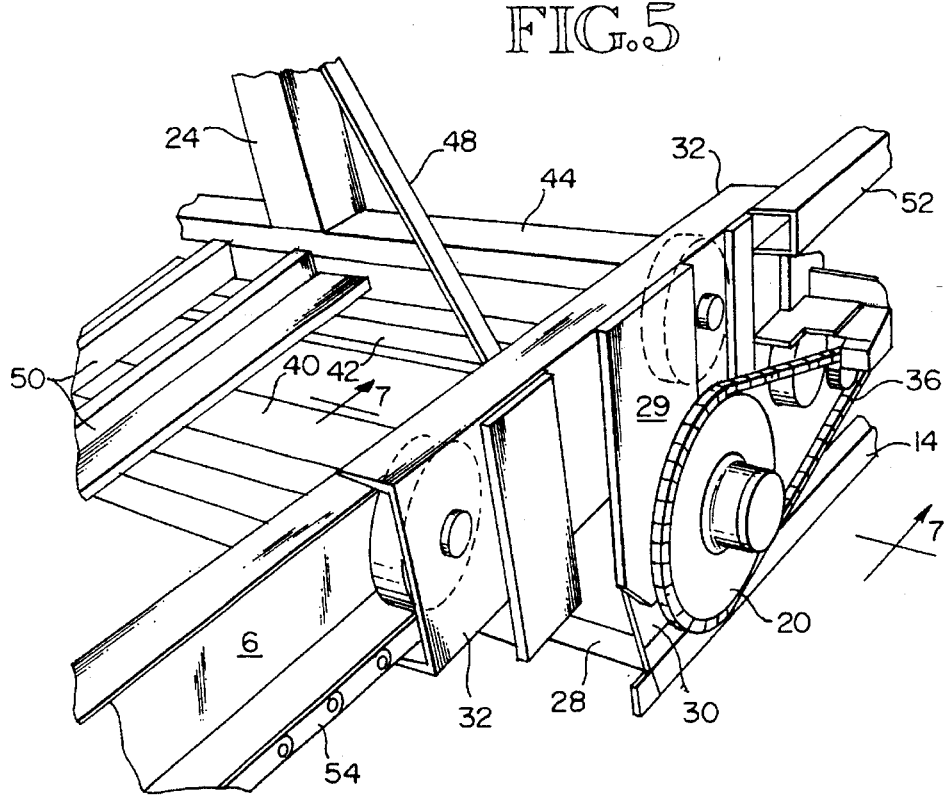
Figure 6:
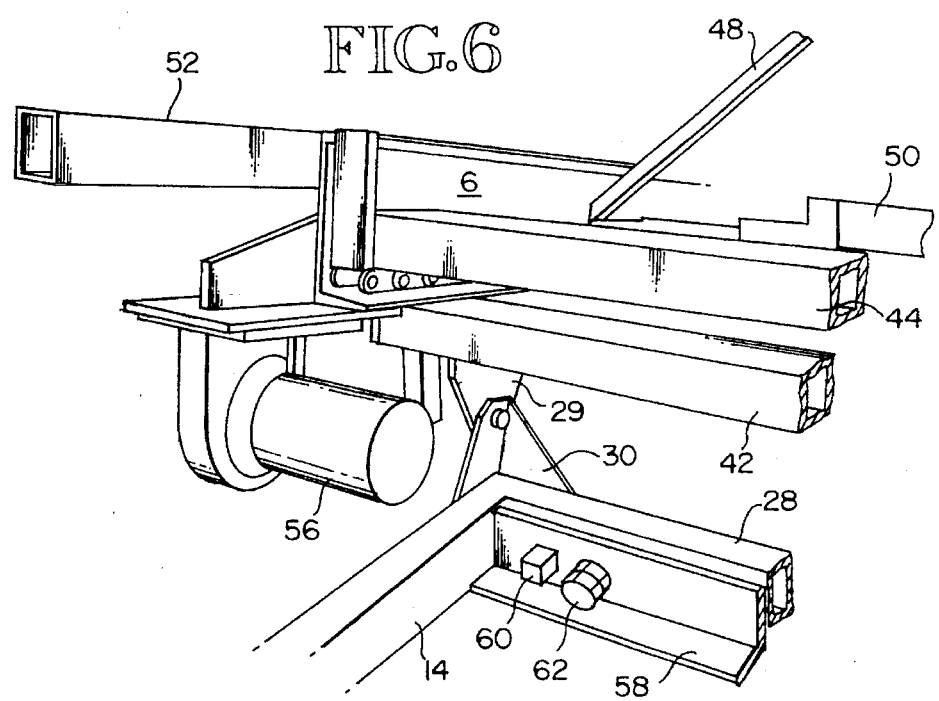

FIG. 6 is a detailed view of the interior side of the mechanism of FIG. 5.

Figure 7:
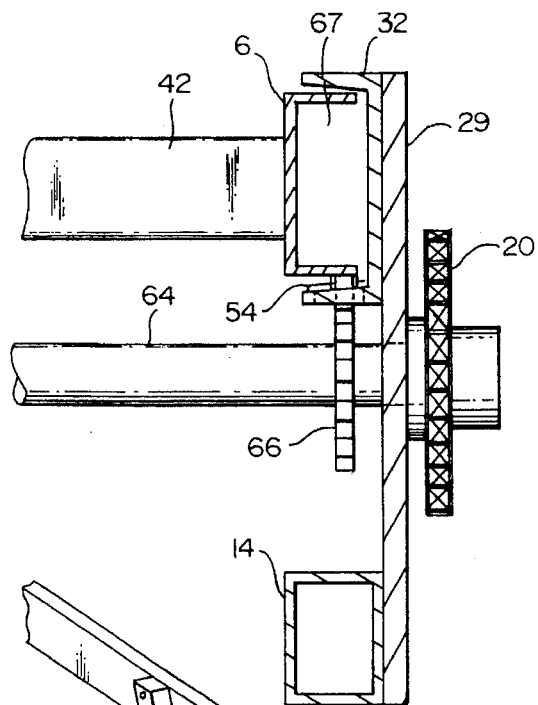

FIG. 7 is a view along line 7—7 of FIG. 5.

Figure 1:
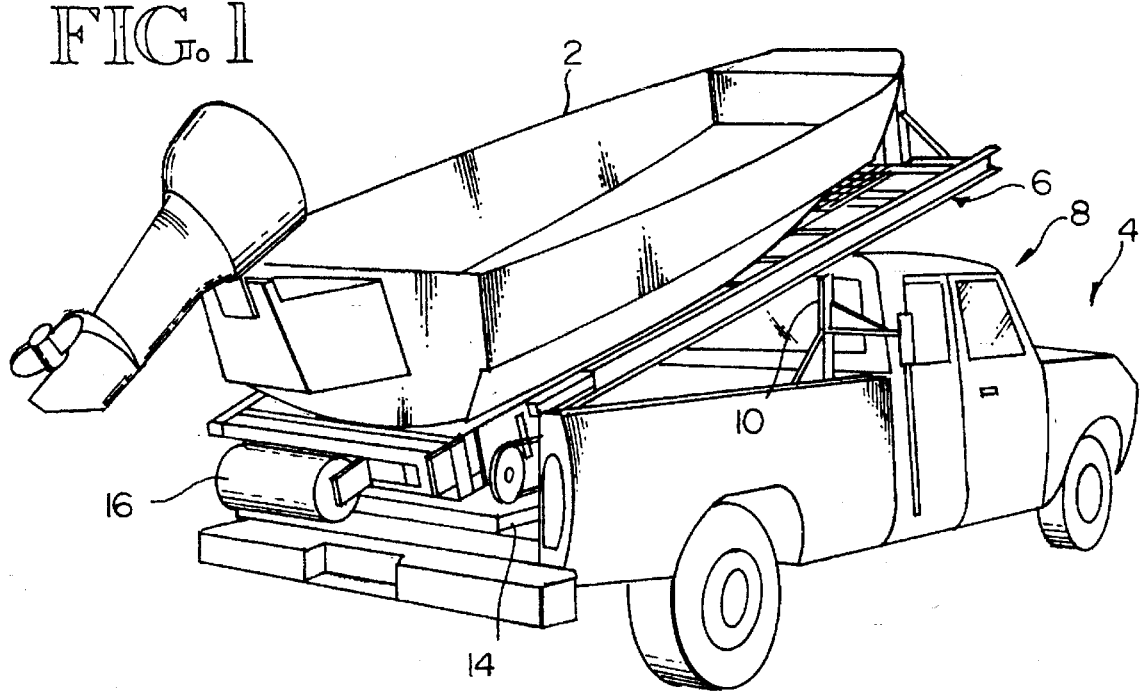
FIG. 1 is an isometric view of the present invention supporting the boat in the back of a pick-up type vehicle.
Figure 8:
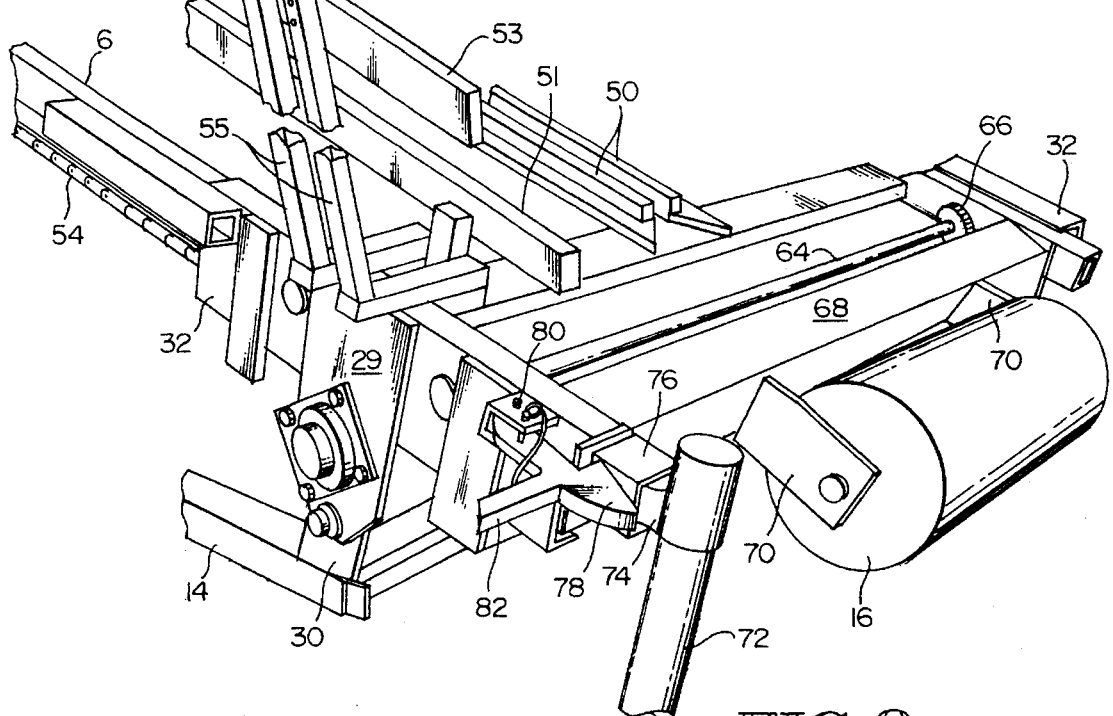

FIG. 8 is a detailed view of the lower or outboard end of the mechanism of FIG. 1.

Figure 9:
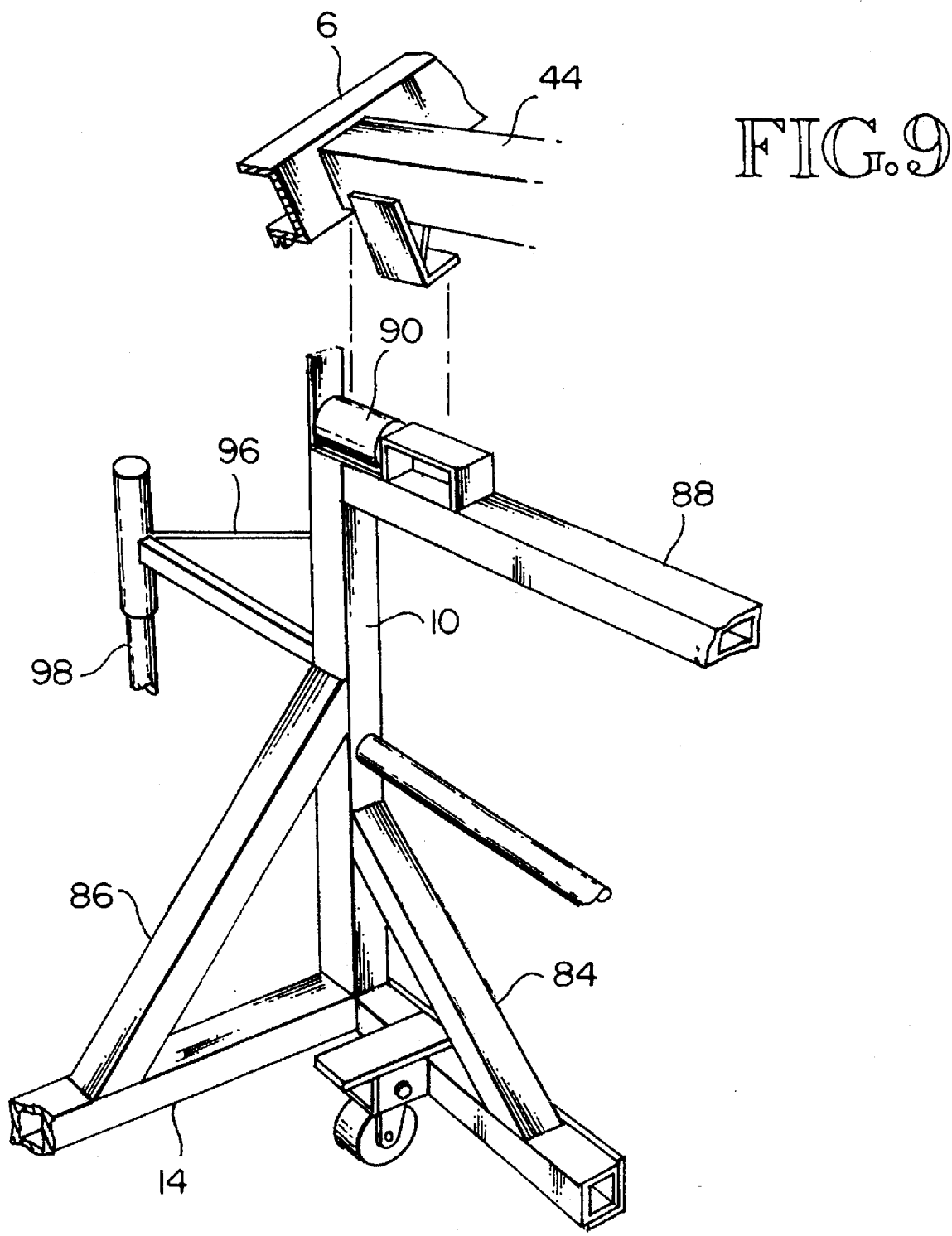

FIG. 9 is a detailed view of the upper end of the boat-supporting apparatus.

BEST MODE FOR CARRYING OUT THE INVENTION

As seen in FIG. 1, a boat 2 is carried upon the top of a pick-up truck 4 mounted upon a boat-supporting mechanism or framework 6 which extends over the cab 8 of the truck 4. The framework and the boat are supported within the pick-up bed by means of vertical legs 10 and 12, not seen in this view, attached to horizontal framework 14. Also seen in this view is a roller mechanism 16 at the outer end of the unloading apparatus, as explained hereinafter.

Figure 2:
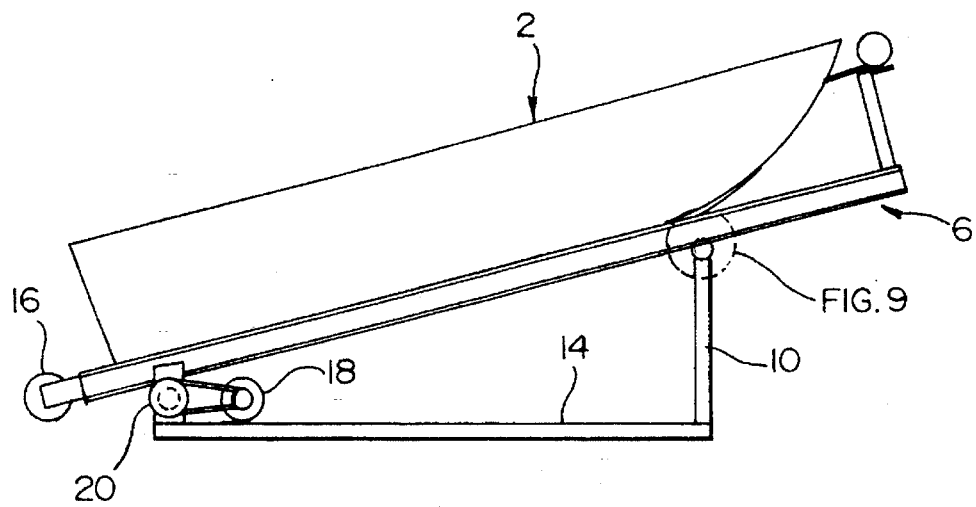
FIG. 2 is a schematic side elevation view of the present invention with the boat in stored position.

Reference is now had to FIG. 2, wherein the framework may more easily be seen in a position removed from the back of the vehicle and, as explained hereinafter, electric motor 18 drives sprocket wheel 20, which controls the position of the extendable portion of the framework supporting position of the boat 2.

FIGS. 3 and 4 depict the boat launch mechanism in its launch/recovery stage and depict the support framework 6 extending outwardly beyond the end of the framework 14 with the boat in place. Typically in this position, the wheel 16 would be resting upon the ground, whether it be above or below the water. As seen in FIG. 4, particularly the winch 22 mounted upon post 24 has been activated, allowing cable 26 to be slack, allowing the boat 2 to move down the support mounted to framework 6.

Reference is now had to FIG. 5, which depicts the upper portion of framework 6 which defines one side of the carrier and shows its interconnection with a relatively fixed framework mounted to the truck which includes horizontal member 14, an upwardly extending ear 30 and cross-piece 28. It is to be noted that a downwardly extending leg 29 which is attached to a pair of trolleys 31 which are pivotally secured to the upwardly extending ear 30 fixedly secured to the elements 14, 28, permitting the framework 6 to pivot about a horizontal axis, as described hereinafter. As seen in this view, the sliding framework, represented by side rails 6, is a rigid rectangular structure, which is mechanically captured in opposing channel members 32, which are likewise of a predetermined distance apart, but permitted to move lengthwise of channel member 32 with relatively little friction being carried by spaced idler wheels 34 rotationally mounted to the channel member 32 forming trolley 31.

Sprocket wheel 20, supported by channel 6, which provides the controlled motivation for transporting the internal framework from its load/unload position to its carry position, is driven by a chain 36, in turn driven by a sprocket 38 driven by a small electric motor. Likewise seen in this view are frame members 40, 42, 44 and 46 which rigidify and link the parallel side channel frame members 6. Further to be seen in this view is a reinforcing support bar 48 which extends from the frame member 6 to the upright post member 24 as well as a pair of spaced elongated elements forming keel support 50, as well as an extension 52 which is used as a securement member. Extension 52 is rigidly welded to channel member 32 and, via a linking member not shown, prevents extensive downward tipping of the sliding framework. It is also to be noted that a linked chain 54 is secured by welding or the like to the bottom edge of frame member 6 for reasons to be explained hereinafter.

Referring now to FIG. 6, the interior portion of the mechanism shown in FIG. 5 can be seen, and it is to be noted that shown in this view is the electric motor 56 for driving a sprocket 20 as well as a fixed internal frame member 58 secured to the bottom of the bed of the pick-up truck to which frame member 28 is secured by means of pin 60 and threaded member 62.

As seen in FIG. 7, the sprocket 20 driven by chain 36 is fixedly secured to rod 64 which extends the width of the movable framework and includes thereon at each of the opposite ends thereof a gear member 66 which meshes with chain member 54 such that rotation of the pair of gear members 66 causes the movable framework to move forward or aft on wheels 67 with respect to the fixed framework as depicted by frame member 14.

Reference is had to FIG. 8, wherein the rectangular, relatively movable interior mechanism has been retracted and the view is taken from the other side of the device, but identical reference numerals are utilized for equivalent parts to avoid confusion. As seen in this view, a rear framework member 68 extends between the two side frame members 6 and has mounted thereon an outwardly extended pair of ears 70 which support roller mechanism 16 which supports the outboard end of the device during launch. Likewise seen in this view is a removable support post 72 which has an outwardly extending leg 74 at its upper end which telescopically received in the end of box beam member 76 such that, when it is desirable to use the vehicle for some other purpose, the entire device may be rested upon the ground utilizing these removable legs and similar ones at the forward end. Also seen in this view is a locking member 78 which is pivotally secured at 80 the framework which is fixedly secured to the truck and is spring-biased inwardly to latch to the movable portion of the boat loading device, resisting outward movement until it is unlatched utilizing handle 82. Further to be seen is removable pin 83 preventing accidental unlatching of locking member 78.

Further support for the boat as it is being transported is found in the additional hull support members 51, one on each side of the keel support 50 and the side supports and guides 53 mounted upon brace members 55.

FIG. 9 depicts the forward end of the frame and includes side rail member 14 rigidly connected vertical member 10 supported by angle members 84, 86. Horizontal upper support member 88 extends between opposing uprights 10 and includes on the upper surface thereof a wheel element 90 to support side rail 6 of the movable carrier mechanism and upwardly extending, rearwardly open catch member 92, which interacts with downwardly extending, forwardly facing L-shaped member 94 mounted to cross-member 44 such that when the movable support mechanism is moved to its fully loaded position, the two cross-members 44, 88 are locked together, preventing any further forward movement and any upward movement, downward movement being prevented by interaction of side rail 6 and roller 90. Also seen in this view is an outwardly extending brace member 96 which telescopically receives ground support member 98, longer than but similar to, the support member 72 seen at the rear. As will be obvious since four of these are provided, the device is stable when placed upon the ground.

As seen and described, the present invention contemplates a relatively simple device for loading and unloading boats or the like while enabling the supporting vehicle to be readily changed and utilized for other purposes.

I claim:

1. A self-launching boat transport, adapted to be removably mounted to a motor vehicle, including:

an extensible retractable boat carrier captured within a relatively fixed, substantially rectangular frame, which is removably secured to the motor vehicle; said carrier movable from a first extended launch position to a second retracted transport position and being fabricated of a pair of substantially parallel interconnected side rails, each of which capture and roll on a set of wheels pivotally mounted to interior surfaces of an outboard end of sides of said frame, permitting the carrier to change the angle of the carrier relative to the frame during loading, and including keel and side hull skids located between the parallel side rails for distributing the weight of the boat over a larger portion of the hull; and further including:

means mounted to the frame to selectively move the carrier from the first to the second position;

a pair of locking devices to prevent inadvertent movement of the carrier relative to the frame, the first locking device being hand-operated and spring-loaded and which automatically locks the carrier in the transport position and must be released to allow movement to the extended position, and the second locking device comprising means for selectively preventing movement of the first locking device; and selectively engageable means at a forward end of the frame to lock the frame to the vehicle and yet permit easy removal of the frame.

2. A self-launching boat transport removably mounted to a vehicle and capable of placing a boat in or removing a boat from a body of water, said transport comprising:

a relatively fixed frame removably latched at its forward end to the vehicle and including a rectangular base element, an upwardly extending support means at its forward end, and a pair of upwardly extending, pivotably mounted transition means at its rearward end, said transition means including roller means at an upper portion thereof;

an extensible, retractable boat carrier including a rectangular frame having side rails captured by said roller means, the boat carrier movable substantially a length of the side rails from a retracted position resting on the forward support means and an extended position with its outer end touching ground, the transition means allowing angularity relative to the vehicle to change to accommodate differing terrains, said boat carrier including keel and side hull skids mounted to the frame above the side rails to support the boat;

positive drive means on each side of the carrier, interacting with the carrier side rail to selectively move the carrier from the extended to the retracted position; and locking means to secure the carrier to the frame.

\* \* \* \* \*